Sept. 3, 1946.  A. E. ALMGREN  2,406,784
OVERCAP APPLYING MACHINE
Filed March 19, 1942  10 Sheets-Sheet 1

INVENTOR
August E. Almgren
BY Ivan D. Thornburgh
Charles H. Erne
ATTORNEYS Sept. 3, 1946.    A. E. ALMGREN    2,406,784
OVERCAP APPLYING MACHINE
Filed March 19, 1942    10 Sheets-Sheet 7

INVENTOR.
August E. Almgren
BY Ivan D. Thornburgh
Charles H. Erne
ATTORNEYS

Sept. 3, 1946. A. E. ALMGREN 2,406,784
OVERCAP APPLYING MACHINE
Filed March 19, 1942 10 Sheets-Sheet 8

Sept. 3, 1946.   A. E. ALMGREN   2,406,784
OVERCAP APPLYING MACHINE
Filed March 19, 1942   10 Sheets-Sheet 10

INVENTOR
August E. Almgren
BY
ATTORNEYS

Patented Sept. 3, 1946

2,406,784

UNITED STATES PATENT OFFICE 2,406,784

OVERCAP APPLYING MACHINE

August E. Almgren, Hillside, N. J., assignor to American Can Company, New York, N. Y., a corporation of New Jersey Application March 19, 1942, Serial No. 435,394

5 Claims. (Cl. 164—48)

The present invention relates to a machine for applying overcaps to containers and the like and has particular reference to cutting off a portion of a web of overcap material to produce an overcap, to placing the severed overcap in position on a container, and to securing the overcap in place while the containers are moving through the machine in a continuous procession.

In the manufacture of fibre containers of the character shown in United States Patent 2,085,979, issued July 6, 1937, to John M. Hothersall, and particularly used for milk, the container after being filled and sealed is protected preferably by an overcap of cellulosic material such as "Cellophane" or the like which is crimped in place over the top end of the container.

The instant invention contemplates an improved machine which cuts the material for such an overcap from a substantially continuous strip and secures the overcap in place on the container by crimping it tightly over the edges of the container while applying heat to the crimped edges of the overcap.

An object therefore of the invention is the provision of an improved overcapping machine wherein the material for the overcap is severed from a substantially continuous trip of material, the cut-off overcap is transferred to a position on top of a container to be protected, and then is sealed permanently in place around its edges by applying heat and pressure thereto thus protecting the surface it covers against contamination.

Numerous other objects and advantages of the invention will be apparent as it is better understood from the following description, which, taken in connection with the accompanying drawings, discloses a preferred embodiment thereof.

Referring to the drawings.

As a preferred embodiment of the instant invention the drawings illustrate a machine for applying a Cellophane or other suitable material overcap A (Fig. 2) to a square fibre milk container B of the character disclosed in the above-mentioned Hothersall patent. The top of such a container is secured in place by a suitable end seam which forms an overhanging ledge C which surrounds the container and it is to this ledge that the overcap is secured in place. It should be understood further that the entire container is provided with a coating of wax or paraffin and this coating when partially melted serves as a bonding agent for holding the overcap in place on the container.

The containers B are advanced through the machine in an upright position in a continuous procession in which the individual containers are stopped momentarily at a sealing station where the overcaps are applied. The overcaps are cut from a continuous web or strip D (Fig. 4) of overcap stock preferably fed from a supply roll E. A cut-off overcap is moved into position over the top of a container to be sealed and is held there stationary while the container moves up to meet the overcap. On the upward travel of the container it picks up the overcap and carries it up into a closing head F (Fig. 4) which secures the overcap in place.

The positioned overcap is of sufficient area to extend beyond the ledges C of the container and these overhanging portions are folded down and inwardly around and against the bottom of the ledges by the closing head F. The closing head also presses the edges of the overcap tightly in place while heating them to produce a permanent seal between the overcap and the wax on the container which binds the overcap to the container and thus encloses the top end thereof.

Figures 1, 2:
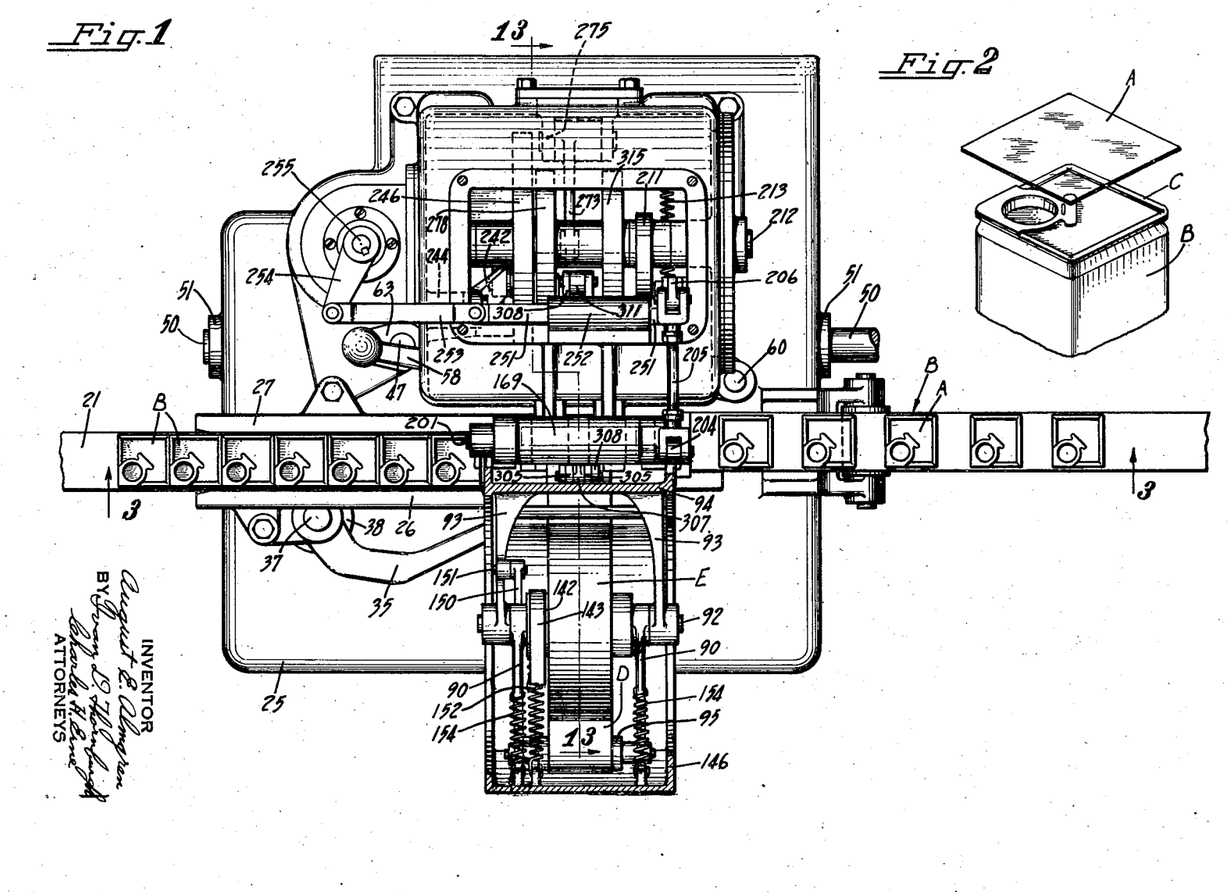
Figure 1 is a top plan view of a machine embodying the instant invention, with parts broken away.
Fig. 2 is a perspective view of the upper portion of a container and an overcap to be applied thereto in the machine shown in Fig. 1.
Figure 3:
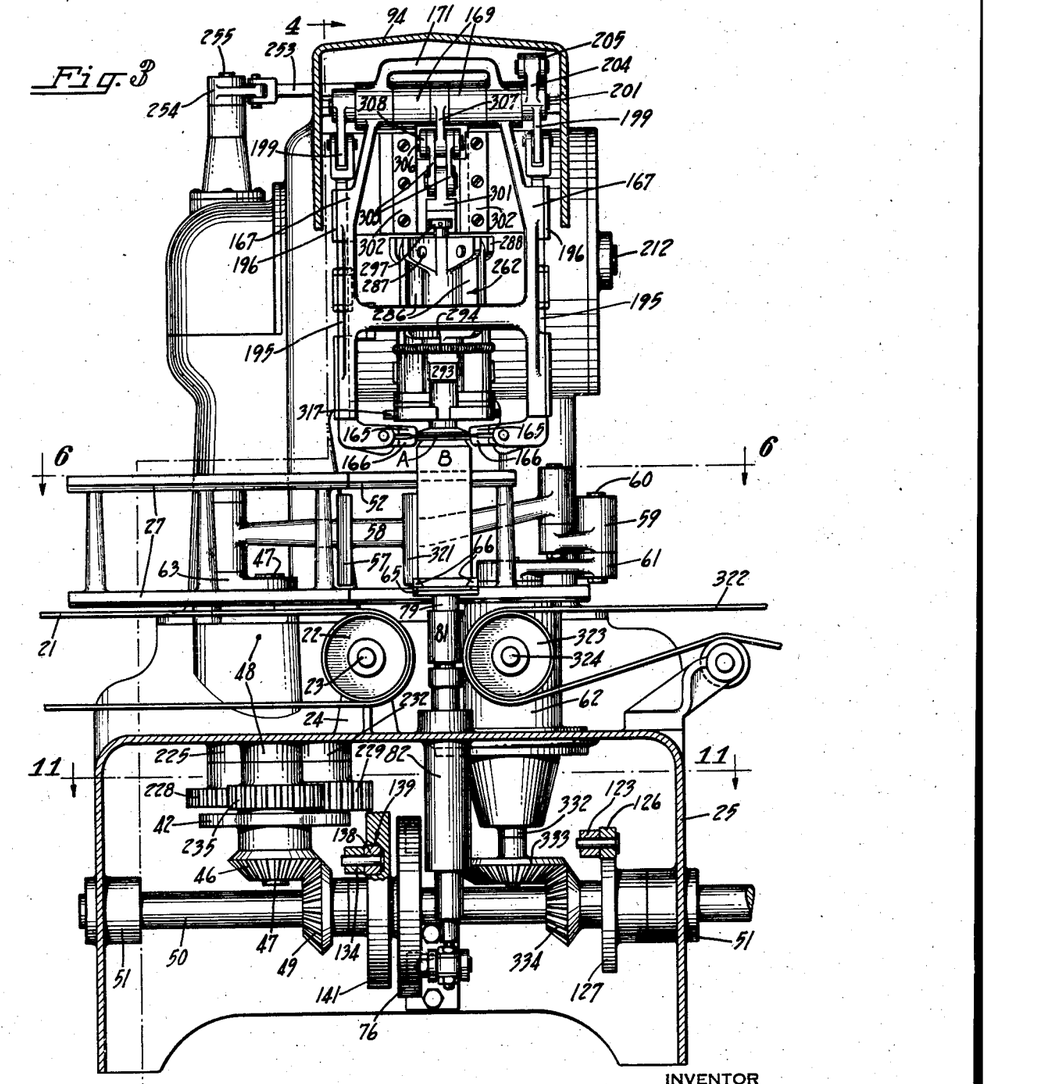
Fig. 3 is a longitudinal section taken substantially along the line 3—3 in Fig. 1, with parts broken away.

The containers B to be capped are introduced into the machine by way of a continuously moving endless belt entrance conveyor 21 (Figs. 1 and 3). The conveyor extends outside the machine and is driven in any suitable manner. In the machine the conveyor takes over an idler pulley 22 (see also Fig. 4) which is mounted on a short shaft 23 carried in a bearing bracket 24 formed as a part of a frame 25 which constitutes the main frame of the machine.

The conveyor 21 carries the entering containers along a straight line path of travel between a pair of guide rails 26, 27 which are disposed one on each side of the conveyor. These guide rails are bolted to the machine frame 25. Adjacent the inner end of the conveyor the innermost container in the entering line is stopped temporarily against further forward travel by a stop block 31 (Fig. 6) which is bolted to the main frame 25. This temporary pause in the advancement of the container is effected so that it can be brought into time with the other moving parts of the machine.

Figure 5:
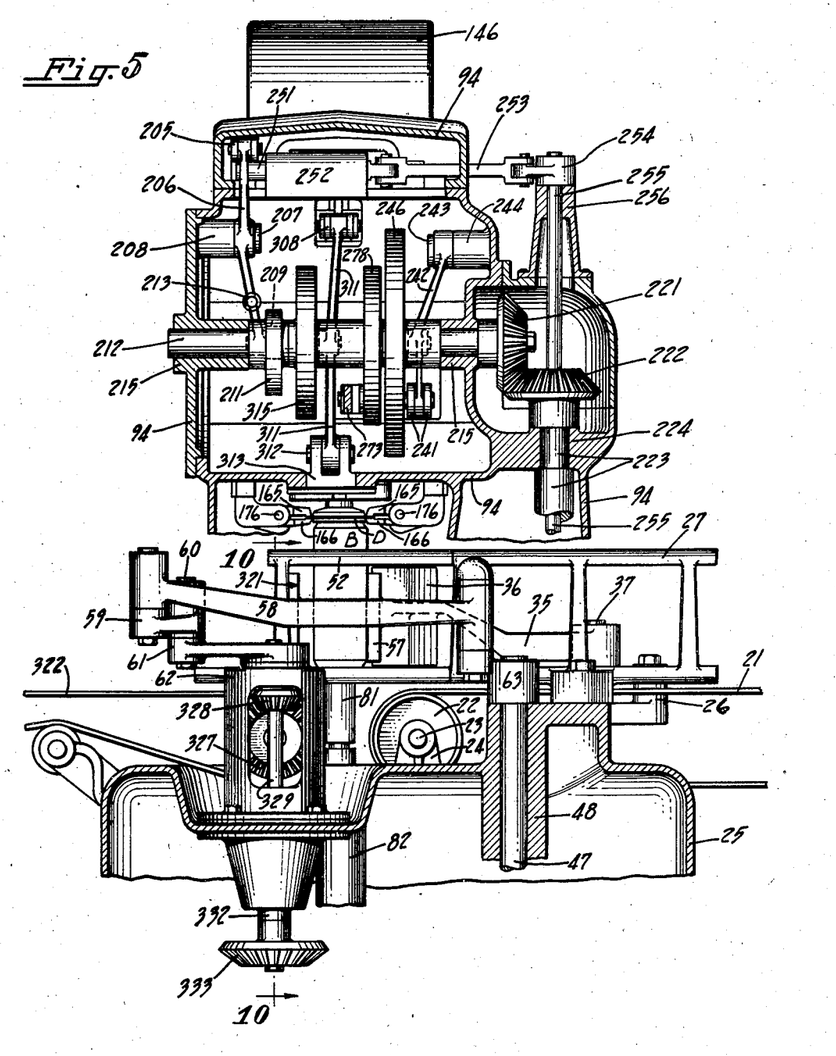
Fig. 5 is a fragmentary longitudinal section taken substantially along the broken line 5—5 in Fig. 4.
Figures 6, 7, 8:
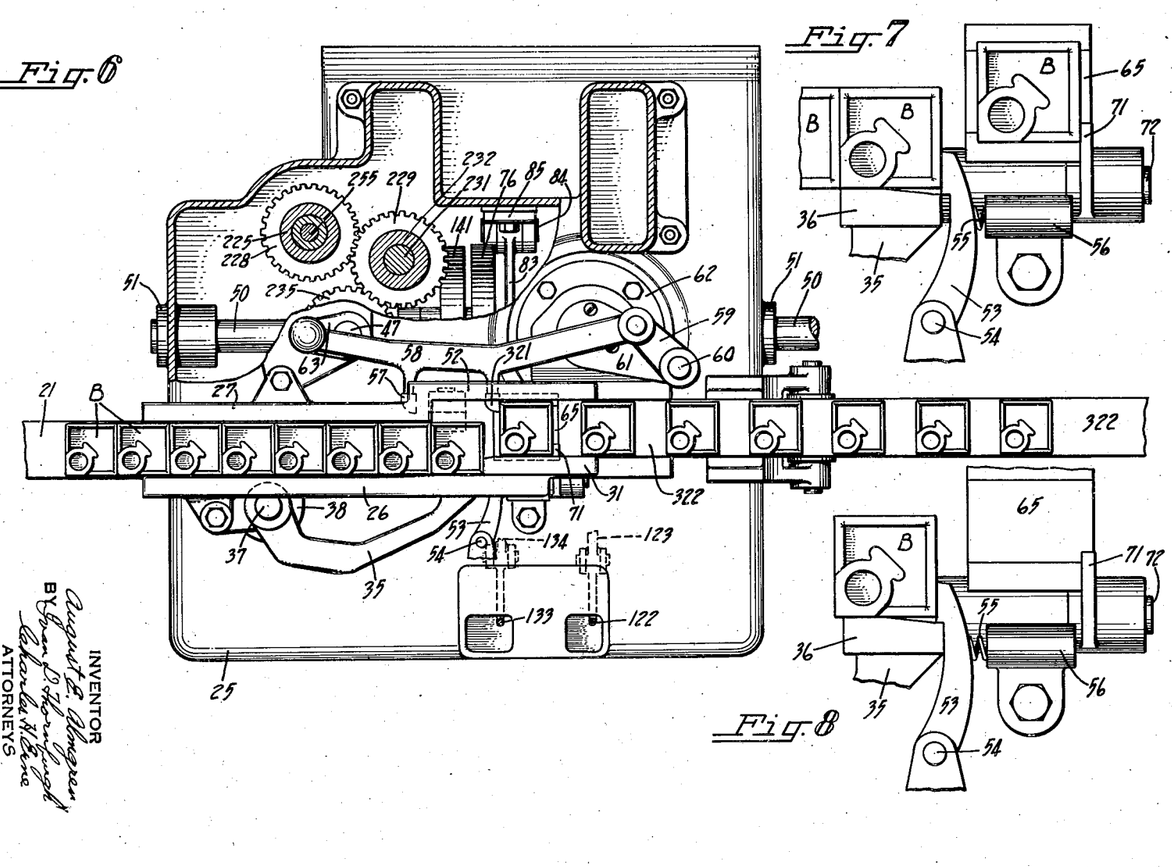
Fig. 6 is a horizontal section taken substantially along the line 6—6 in Fig. 3, with parts broken away.
Figs. 7 and 8 are enlarged detail views of a portion of the machine shown in Fig. 6, the views showing the movable parts and a container in different positions, with parts broken away.
Figure 9:
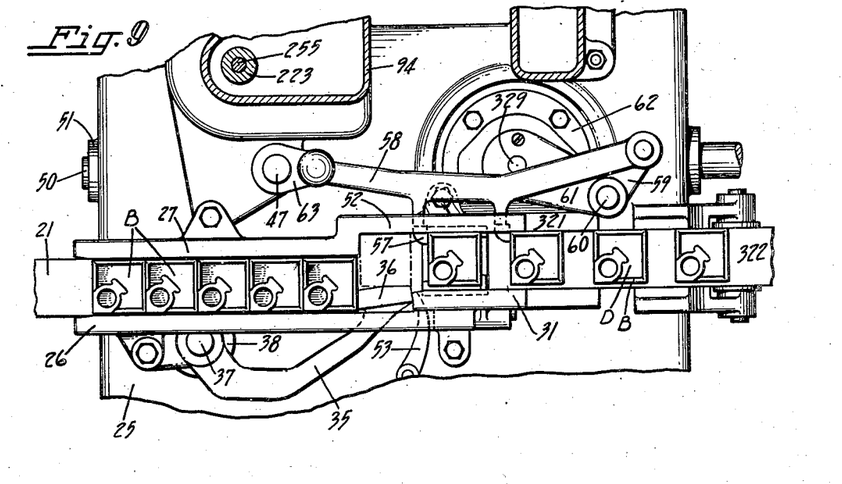
Fig. 9 is a view similar to Fig. 6 and showing the movable parts in a different position.
Figure 11:
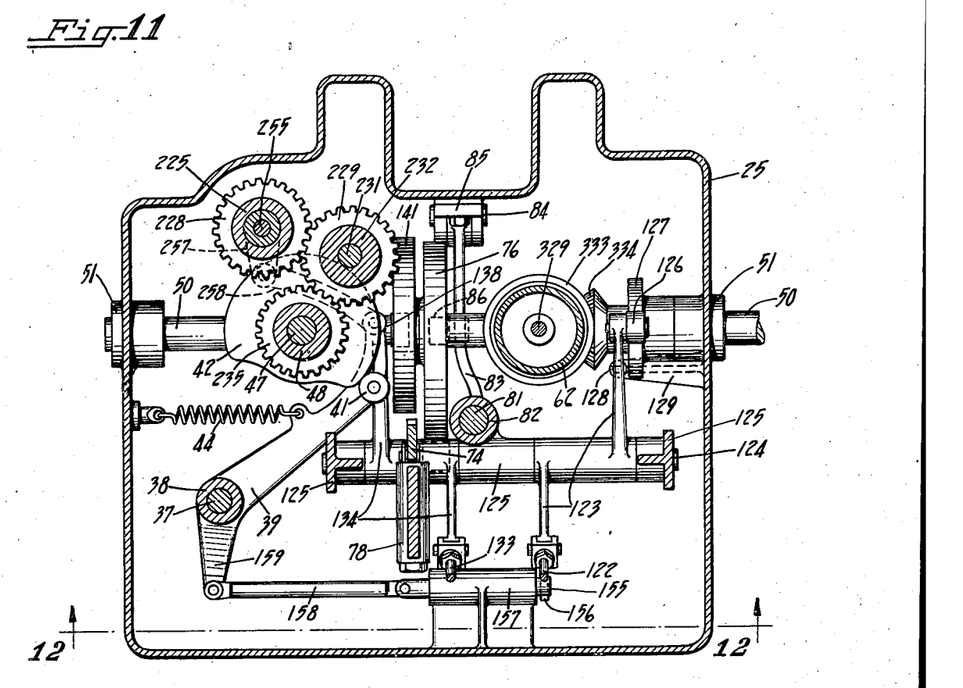
Fig. 11 is a horizontal section taken substantially along the line 11—11 in Fig. 3.

While the innermost container is in this arrested position it is shifted sidewise from the position shown in Fig. 6 to that shown in dotted lines in Fig. 9. This shifting of the container is performed by a transfer arm 35 (Figs. 1, 4 and 6) formed with a push plate 36 (see also Figs. 5 and 9) which engages against a side of the container. The transfer arm is mounted on a vertical rock shaft 37 carried in a bearing 38 (see also Fig. 4) formed in the main frame 25. The lower end of the shaft carries a bell crank 39 having on one leg a cam roller 41 (see also Fig. 11) which operates against an edge cam 42. A spring 44 holds the roller against the cam. One end of the spring is connected to the second leg of the bell crank 39 while the opposite end of the spring is secured to the machine frame 25.

Figure 12:
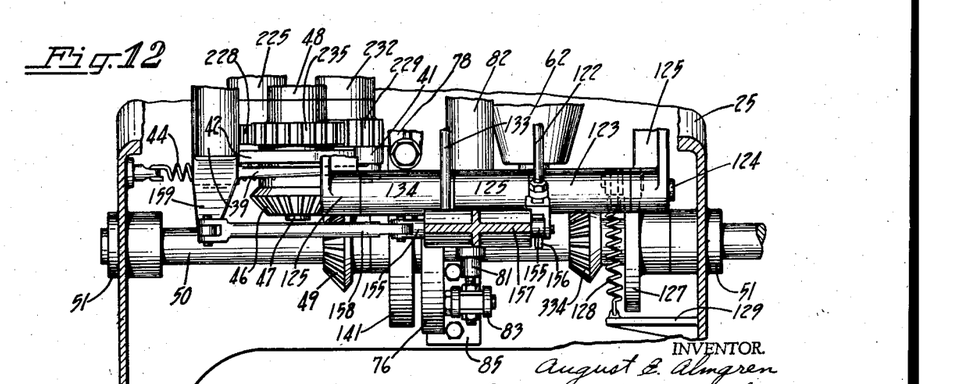
Fig. 12 is a vertical section taken substantially along the line 12—12 in Fig. 11, with parts broken away.

The cam 42 is formed integrally with a bevel gear 46 (Figs. 3, 4 and 12) mounted on a vertical crank shaft 47 carried in a long bearing 48 formed on the main frame 25. The bevel gear 46 meshes with and is driven by a bevel gear 49 mounted on a continuously rotating main drive shaft 50 which is journaled in bearings 51 formed in the machine frame 25. The drive shaft may be rotated in any suitable manner.

Hence rotation of the drive shaft 50 rocks the cam arm 39 and this, through the vertical shaft 37, rocks the transfer arm 35 at the proper time to shift the container B. The transfer arm pushes the container into engagement with an offset guide rail 52 (Fig. 6) and since the container is still partially on the conveyor 21, the arm temporarily holds it in this shifted position under slight pressure to prevent premature longitudinal movement of the container. The guide rail 52 is formed as a part of the guide rail 27.

Provision is made for stopping the feeding of containers through the machine when there are insufficient containers entering by way of the entrance belt 21. This is brought about by a hook latch 53 (Figs. 6, 7 and 8) which is mounted on a pivot stud 54 secured in the main frame 25. The latch is backed up by a spring 55 located in a boss 56 formed on the main frame. The inner end of the latch extends into the path of travel of the containers as they approach the stop lug 31.

The latch spring 55 presses the hook latch 53 against the adjacent edge of the container push plate 36 and the hook portion of the latch thus normally holds the plate from movement against the incoming containers as shown in Fig. 8. It is this holding action that prevents feeding of the containers through the machine.

When the line of incoming containers is sufficient, such as shown in Fig. 6, there is enough pressure on the innermost container in the line to form the latch 53 back as far as the stop lug 31 and this releases the hook portion of the latch from the push plate and thus permits the plate to function. Normally there are sufficient containers passing into the machine to keep the push plate in a released condition so that there will be no interruption in the operation of the machine.

Just as the transfer arm 35 begins to move back through a return stroke to release a container shifted into position against the guide rail 52, the container is engaged by a timing finger 57 (Figs. 3 and 6) and is advanced one step longitudinally of the machine. The timing finger 57 is formed on a stroke bar 58 which is disposed adjacent the path of travel of the containers. One end of the stroke bar is pivoted on a rocker arm 59 mounted on a pivot pin 60 secured in a bracket 61 (see also Figs. 5 and 10) fastened to a gear housing 62 bolted to the machine frame 25.

Figure 4:
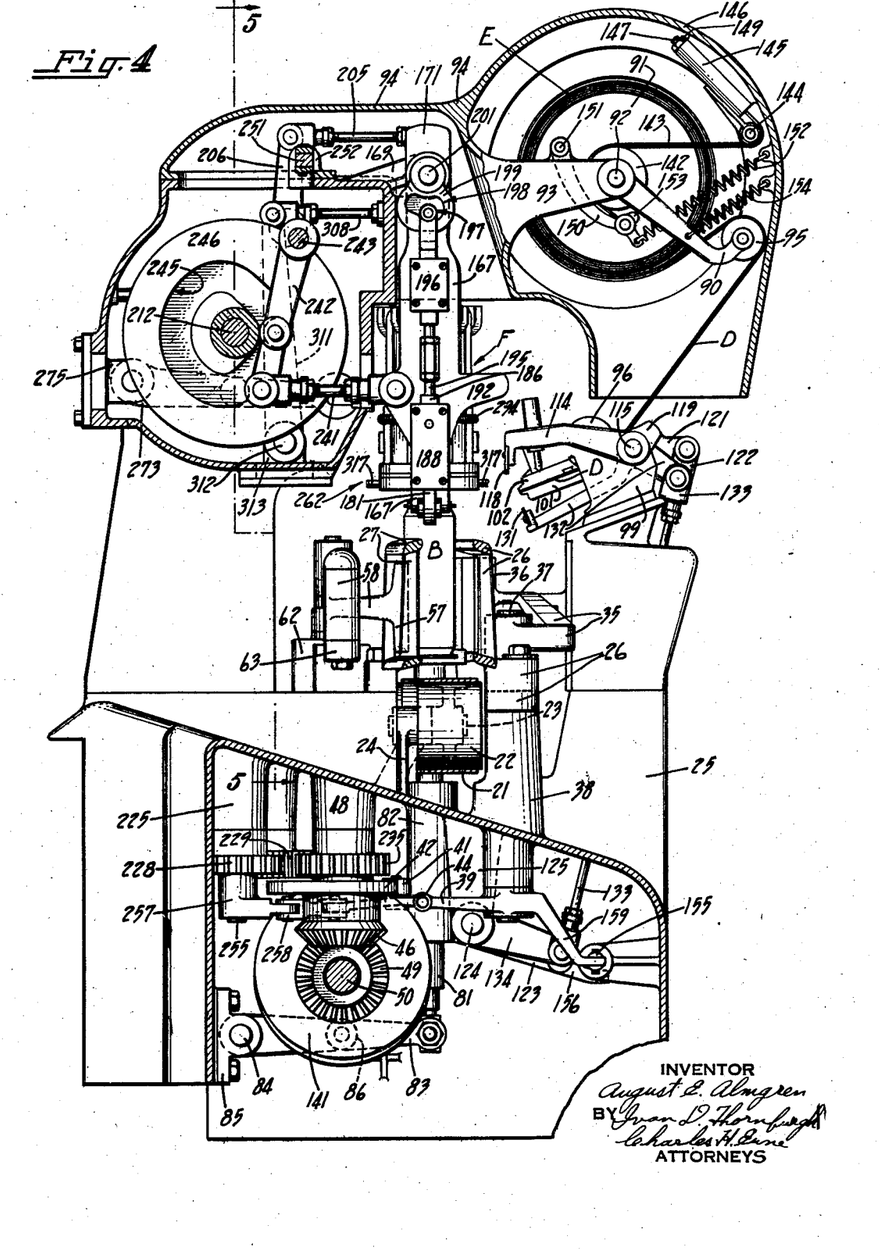
Fig. 4 is a transverse section taken substantially along the broken line 4—4 in Fig. 3, with parts broken away.

The opposite end of the stroke bar 58 is connected pivotally to a crank 63 mounted on the upper end of the vertical drive or crank shaft 47 (see Fig. 4). By reason of this connection with the drive shaft 47, the stroke bar 58 is reciprocated through a forward or feeding stroke, as shown in Fig. 9, and thence through a return stroke, as shown in Fig. 6.

Figure 21:
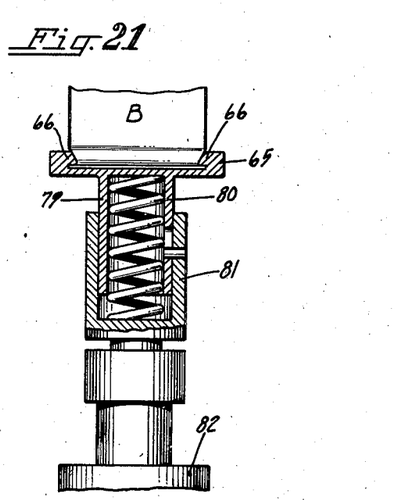
Fig. 21 is an enlarged detail view of a lifter pad device used in the machine with a container in place, with parts of the device being broken back and shown in section, with a portion of the container broken away.
Figure 22:
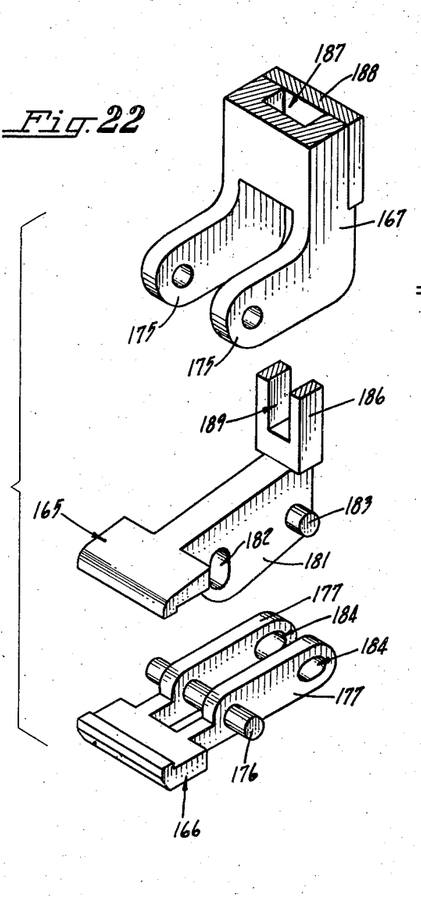
Fig. 22 is an enlarged, exploded perspective view showing the transfer finger parts illustrated in Figs. 14 and 15.

On the feeding stroke of the stroke bar 58, the timing finger 57 pushes the shifted container B longitudinally of the machine one step in time with the other moving parts of the machine and places it in position on a lifter pad 65 (Figs. 3, 6 and 21). Guide rails 66 formed on the pad hold the container against displacement.

During this placing of the container B on the lifter pad 65, a stop or gauge finger 71 (Figs. 6 and 10) is interposed temporarily in the path of travel of the container to bring the latter to rest in a predetermined location on the pad. The stop finger 71 is mounted on a short shaft 72 which is carried in bearing brackets 73 on the main frame 25. The shaft also carries a cam lever 74 (Fig. 10) having a cam roller 75 which operates against an edge cam 76 mounted on the main drive shaft 50 (Fig. 3). It is this cam that shifts the stop finger 71 into and out of container gauging position in time with the movement of the containers through the machine. The roller is maintained in engagement with the cam by a spring barrel 77 (Figs. 10 and 11) which presses against the cam lever 74. The spring barrel is located in a lug 78 formed on the machine main frame 25.

After a container is located properly on the lifter pad 65 and while the timing finger 57 is moving back through a return stroke, the container is lifted to an elevated position to receive its overcap A. For this purpose the lifter pad is formed on a long depending sleeve 79 (Figs. 3 and 21) which contains a compression spring 80 and which extends down into a long stem 81. The spring provides a cushion for the container to prevent its being crushed when it is lifted up into a clinching head, as will be hereinafter explained. The stem extends down through a slide bearing 82 in the machine main frame 25.

Figure 10:
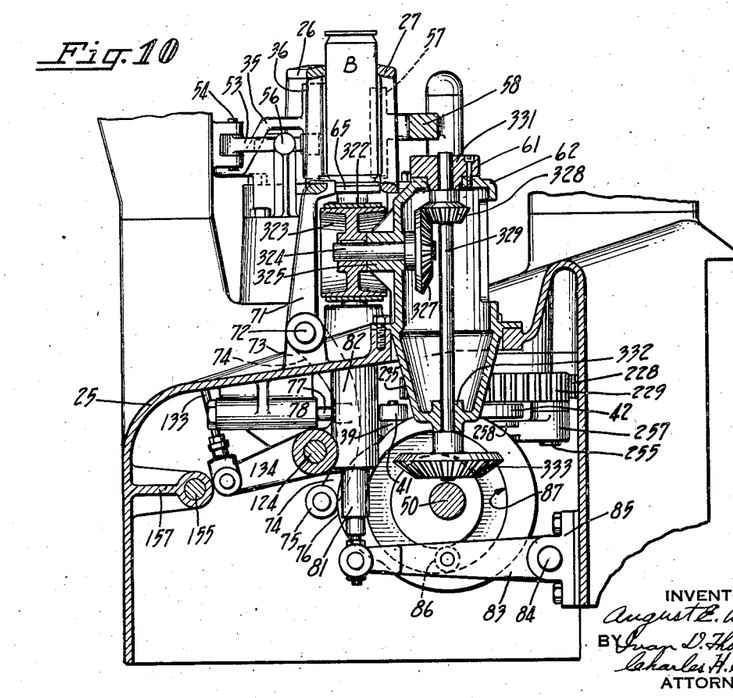
Fig. 10 is a vertical section taken substantially along the line 10—10 in Fig. 5, with parts broken away.

The lower end of the lifter stem 81 is connected pivotally to a horizontal cam lever 83, Figs. 4 and 10, mounted on a pivot shaft 84 carried in a bearing block 85 secured to the main frame 25. The cam lever 83 extends adjacent the edge cam 76 and carries a cam roller 86 which operates in a cam groove 87 formed in a face of the edge cam. It is this cam groove that raises and lowers the lifter pad 65 and a container B located thereon, in time with the other moving parts of the machine.

While a container B is being raised into a position to receive an overcap A, the overcap is severed from the supply roll E and shifted into vertical alignment with the rising container, as hereinbefore mentioned. The supply roll E of overcap stock is retained on a reel 91 (Fig. 4) supported on a shaft 92 (see also Fig. 1) carried in bearing brackets 93 formed on a super-structure or upper frame 94 of the main frame 25.

Figure 23:
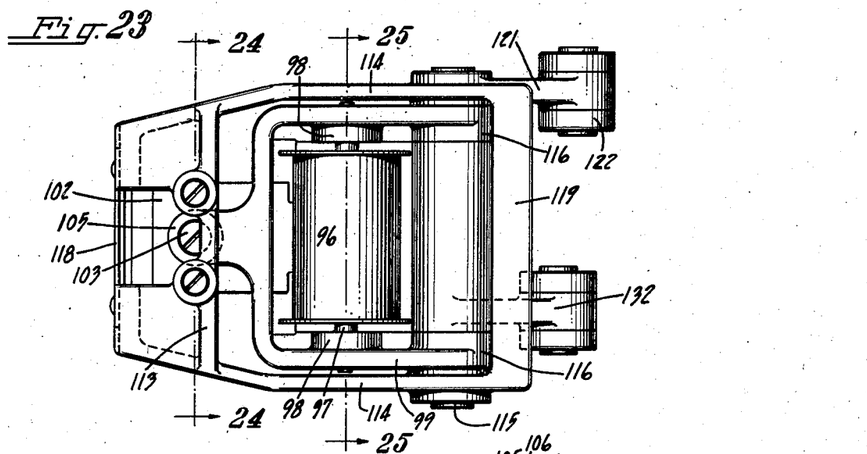
Fig. 23 is an enlarged top plan view of a cutting device used in the machine.
Figures 24, 25:
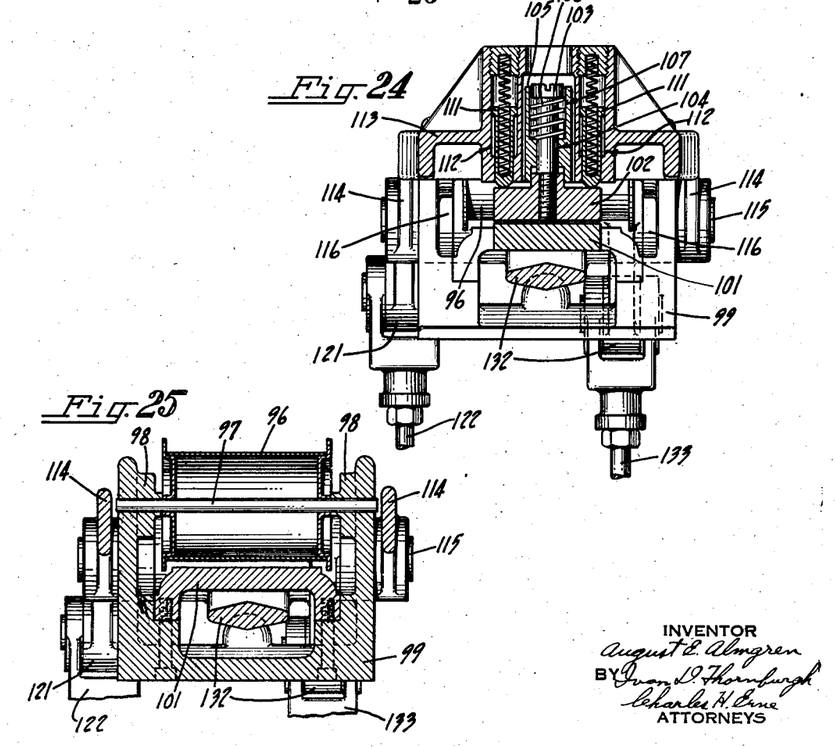
Figs. 24 and 25 are vertical sections taken substantially along the lines 24—24 and 25—25 in Fig. 23.

The web D of overcap material as it comes from the supply roll E, passes over an idler pulley 95 which is mounted on arms 90 carried on the roll shaft 92. From the idler roller 95, the web passes under a flanged guide roller 96 (Figs. 4, 23 and 25) mounted on a shaft 97 carried in bearings 98 in a cut-off bracket 99 secured to the machine frame 25. The leading end of the web D is held tightly between a stationary anvil pad 101 and a superimposed pressure plate 102.

The pressure plate 102 is loosely suspended from a stud 103 (see Fig. 24) which extends up through a bore 104 in a boss 105 on the cut-off bracket 99. The head of the stud rests upon a compression spring 106 which surrounds the stud and which is located in an enlarged shouldered bore 107 in the boss 105.

The pressure plate 102 also is maintained under pressure of a pair of vertical spring barrels 111 which bear down on top of the plate. The spring barrels are located in sockets 112 formed in a yoke 113 which connects a pair of arms 114. These arms 114 are mounted on a pivot shaft 115 carried in a pair of spaced bearings 116 formed in the cut off bracket 99.

The inner ends of the arms 114 terminate adjacent the inner ends of the anvil 101 and the pressure plate 102, and carry a serrated cut off knife 118 (see also Fig. 18) which functions in severing an overcap A from the strip D. The opposite ends of the arms are tied together by a bridge 119 and one of the arms is formed with a lever extension 121. The lever extension is connected by a link 122 (Figs. 4, 6, 11 and 12) to a cam arm 123 mounted on a pivot shaft 124 carried in bearing brackets 125 formed in the machine frame 25. The inner end of the cam arm 123 carries a cam roller 126 (Figs. 3 and 11) which operates against an edge cam 127 mounted on the main drive shaft 50. The roller is held against the cam by a tension spring 128 (Fig. 12) which is connected between the cam arm and a bracket 129 which extends inwardly from the machine frame 25.

Adjacent the cut-off knife 118 and spaced inwardly thereof is a cooperating auxiliary cut-off knife 131 which is merely a support edge for the web being cut. The auxiliary cut-off knife is disposed below the path of travel of the web D and is secured to the inner end of an auxiliary cut-off lever 132. This lever is mounted on the pivot shaft 115 and is connected by a link 133 to a cam lever 134. The cam lever is mounted on the pivot shaft 124. The inner end of the cam lever 134 carries a cam roller 138 (Fig. 3) which operates in a cam groove 139 of a face cam 141 mounted on the main drive shaft 50.

Thus as the main drive shaft 50 rotates, the the cams 127, 141 shift the links 122, 133 and thus operate the cut-off levers 114, 132 in scissor fashion in time with the other moving parts of the machine. This cuts off an overcap from the web D. When the cut-off levers are in an open position, as shown in Fig. 4, the spring barrels 111 in the levers 114 relieve pressure on the pressure plate 102 and thus permit the spring 106 to raise the plate off the web D. While the pressure thus is relieved from the web, the latter is drawn forward a distance sufficient to measure and expose enough material to produce an overcap A.

After this predetermined quantity of the web D has been measured off, the cut-off levers begin to close or come together for the severing operation. During this movement of the cut-off levers the spring barrels 111 move down against the pressure plate 102 and thus force the latter down against the web D. This clamps the latter against the anvil 101 and hence holds the web from movement. As the cut-off levers continue to close, the auxiliary knife 131 comes up against the bottom of the web to support it while the serrated knife 118 comes down against the top of the web first, to pierce and then to sever the overcap from the web.

In order to prevent the roll of overcap material from rotating just after a length of the web D is measured off, an automatic brake device is provided on the reel 91. This device includes a brake drum 142 (Figs. 1 and 4) which is mounted on the reel shaft 92 adjacent the reel. This drum carries a ribbon brake band 143 which operates over a pin 144 carried in a boss 145 secured to a cover 146 for the reel 91. This end of the band is secured to a long adjustable stud 147 which is carried loosely in the boss 145. A nut 149 on the outer end of the stud is provided for adjusting the brake band.

The opposite end of the brake band 143 is secured in a swing lever 150 mounted on a pivot pin 151 carried in a boss formed on the reel arm 93. The lever is maintained under action of a tension spring 152 which is stretched between the outer end of the lever and the reel cover 146. This keeps the brake band taut around the brake drum 142. The outer end of the lever also is formed with a button 153 which is located close but in spaced relation to one of the reel arms 90.

Hence when the web D of overcap material is pulled to measure off a length for an overcap, the web draws the reel levers 90 downwardly and this brings the lever on one side into engagement with the button 153 on the adjacent brake lever 150. This moves the brake lever inwardly. This movement of the brake lever releases the pressure on the brake band and thus frees the brake drum to permit the reel 91 to rotate.

When the pull on the web D ceases, the reel levers 90 shift back into original position under the action of a pair of springs 154 which are located one on each side of the reel and which are stretched between the levers and the reel cover 146. The engaged lever thus moves away from the button on the brake lever 150 and thereby permits the spring 152 to draw the brake band taut around the drum. This brings the reel 91 to rest and holds it against rotation until the web D is pulled again to measure off another overcap.

When no containers are passing through the machine, as when the pusher plate 36 is held inoperative, the knife lever 114 and the pressure plate 102 are held inoperative. This prevents feeding of the web D and also prevents an overcap from being cut off. This is brought about by a stop pin 155 (Figs. 4, 10, 11 and 12) having one end disposed adjacent the path of travel of a lug extension 156 on the knife operating cam arm 123. The stop pin 155 is carried in a bracket 157 formed on the main frame 25. The opposite end of the stop pin is connected by a link 158 to a short arm 159 formed as a part of the lever 39 mounted on the container pusher plate actuating rock shaft 37.

Hence every time the pusher plate actuating shaft 37 is rocked by the edge cam 42 to feed containers into the machine, the short arm 159 pushes the stop pin 155 into the path of travel of the lug extension 156 on the knife cam arm 123. This occurs in time with the movement of the knife cam arm and while the arm is at rest just prior to making a cut-off stroke. Normally the pin is again withdrawn before the cut-off stroke is performed.

However, when the pusher plate 36 is stopped from feeding containers into the machine, the rocker shaft 37 is held stationary with the stop pin 155 in an extended position. Hence when the knife cam arm 123 is about to operate through its next stroke it is stopped by the lug extension 156 striking against the extended stop pin. This prevents the arm from making its stroke and thus prevents operation of the knife 118 and movement of the anvil pressure plate 102. It is this action, in connection with other elements yet to be described, that prevents feeding of the web D until containers are again brought into the machine.

The measuring off of the overcap by drawing the web forward is effected by a pair of upper and a pair of lower gripper fingers 165, 166 (Figs. 3, 14, 15 and 22). One upper and one lower finger are located on each side of the path of travel of the web D. The fingers on each side are carried on a swing arm 167 (see also Figs. 3 and 4). The two arms are mounted on a pivot sleeve 168 (see Fig. 13) carried in bearings 169 in the upper frame 94.

At the top, the swing arms are tied together by a tie member 171 so that they operate in unison. At the bottom, the lower end of each swing arm 167 is bifurcated and is formed with inwardly extending ears 175 (see Figs. 13, 16 and 22). These ears on each side form a support for a pivot pin 176 (see also Figs. 17 and 22) of the associated lower gripper finger 166.

Each lower gripper finger 166 is formed as an integral part on the inner ends of spaced and parallel lever arms 177. In the assembled position these two arms 177 are disposed inside of the ears 175. The ears form a mounting for the pivot pin 176.

Each upper gripper finger 165 is formed as an integral part of a single lever arm 181. This arm fits between the spaced arms 177 of the lower fingers. The inner end of each upper arm 181 is formed with a vertical slot 182 through which the pivot pin 176 extends. The outer end of each upper arm carries a short hinge pin 183, the ends of which extend into horizontally elongated slots 184 cut through the outer ends of the lower parallel arms 177.

The outer end of each upper gripper finger arm 181 is formed with a rectangular vertical shank 186 (see Figs. 14, 16 and 22) which is disposed in a vertical slideway 187 formed in the swing arm 167 on that side. The shank is retained against displacement by a cover plate 188 which is secured to the swing arm.

Figures 13, 14, 15, 16, 17, 18:
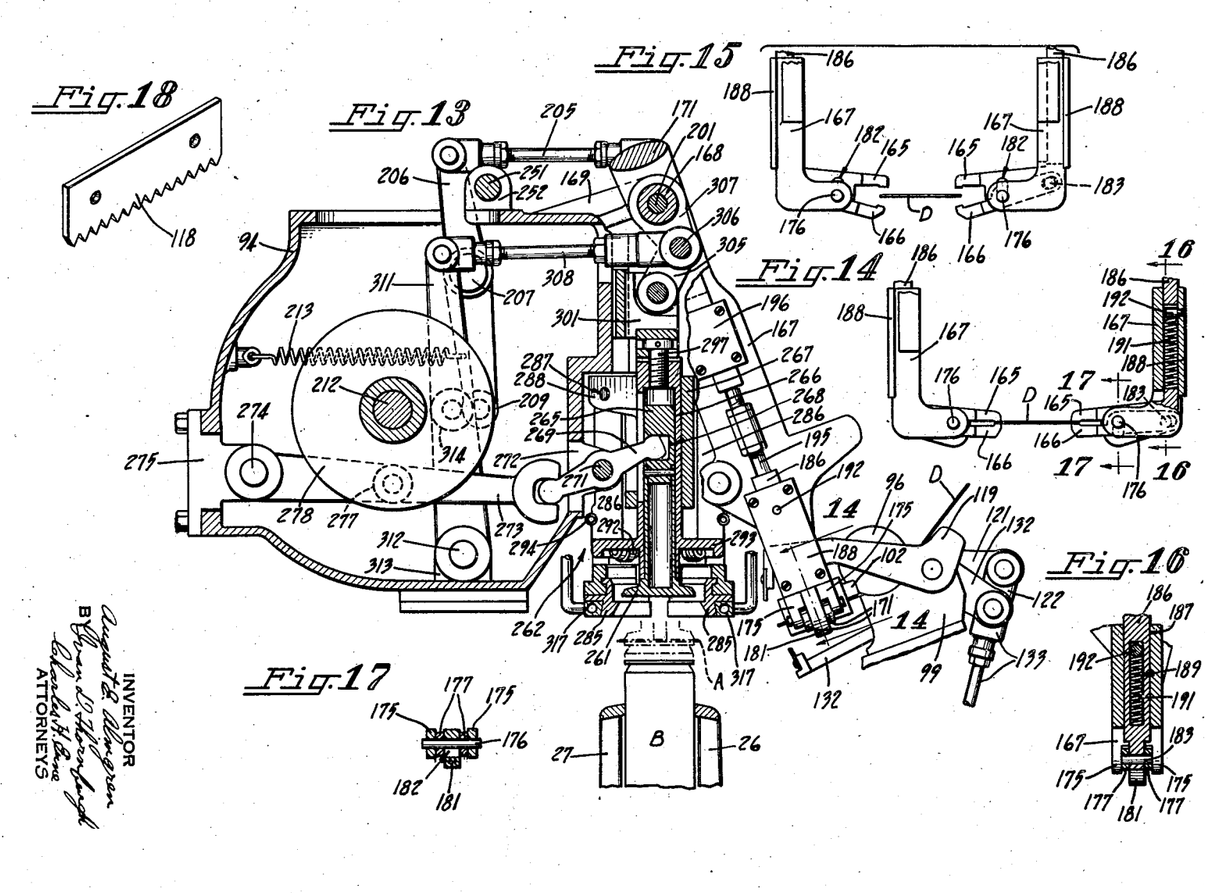
Fig. 13 is an enlarged section of the upper portion of the machine and taken substantially along the broken line 13—13 in Fig. 1, with parts broken away.
Figs. 14 and 15 are fragmentary elevational views of transfer fingers in the machine, as viewed from a plane indicated by the line 14—14 in Fig. 13, with parts broken away and parts shown in section.
Figs. 16 and 17 are sectional details taken substantially along the respective lines 16—16 and 17—17 in Fig. 14.
Fig. 18 is an enlarged perspective view of a cutting element used in the machine.

Each shank 186 is formed with a vertical, elongated slot 189 in which a compression spring 191 is disposed. The upper end of the spring engages against a pin 192 which is carried in the cover plate 188. This spring normally presses down on the upper finger arm 181 and maintains its fingers 165, 166 in a closed position, as shown in Fig. 14.

Actuation or opening of the gripper fingers 165, 166 at the proper time is effected by rods 195 (Figs. 3, 4 and 13) which are secured to the upper ends of the shanks 186. Rods 195 extend up through bearing blocks 196 on the outside of the swing arms 167. The upper ends of the rods are bifurcated and carry cam rollers 197 which operate on cam surfaces 198 of a pair of internal edge cams 199. Each cam is mounted on the outer end of a rock shaft 201 which extends through the swing arm pivot sleeve 168.

One of the edge cams 199, the one at the right as viewed in Fig. 3, is formed as an integral part of a lever 204 which is connected by a link 205 (Figs. 1, 5 and 13) to a substantially vertical cam lever 206. The cam lever is mounted on a pivot pin 207 carried in a boss 208 of the upper frame 94. The lever carries a cam roller 209 which operates against an edge cam 211 mounted on a cam shaft 212. A tension spring 213 stretched between the lever and the upper frame 94 holds the cam roller against the cam. The shaft is journaled in bearings 215 formed in the machine upper frame 94.

The cam shaft 212 is rotated continuously by a bevel gear 221 (Fig. 5) which is mounted on the outer end of the shaft. The gear meshes with and is driven by a bevel gear 222 which is mounted on the upper end of a vertical tubular auxiliary drive shaft 223. The drive shaft is journaled in a bearing 224 in the upper frame 94 and in a bearing 225 (Figs. 3, 4 and 6) in the lower frame 25.

The lower end of the drive shaft 223 carries a spur gear 228 (see also Fig. 11) which meshes with an idler gear 229 mounted on an idler shaft 231 journaled in a bearing 232 formed on the machine main frame. The idler gear 229 meshes with a gear 235 which is mounted on the crank shaft 47 (Fig. 5) driven by the bevel gear connection 48, 49 with the main drive shaft 50.

Thus through this connection with the main drive shaft 50, the cam 221 rotates in time with the other moving parts of the machine and actuates the cam lever 206 and its link 205 to open and close the gripper fingers 165, 166 as hereinbefore explained. This opening and closing of the gripper fingers is also effected in time with the movement of the swing arms 167.

The swing arms 167 are shifted by way of a link 241 (Fig. 4) which pivotally connects the swing arms with the lower end of a cam lever 242 (see also Fig. 5). The cam lever is mounted on a pivot pin 243 carried in a boss 244 formed on the upper frame 94. Intermediate its ends the cam lever carries a cam roller which operates in a cam groove 245 of a face cam 246 mounted on the cam shaft 212.

The rotating cam 246 first shifts the swing arms 167 outwardly through an idle stroke into the position shown in Fig. 13. When first brought into this position, the gripper fingers 165, 166 are open and are disposed alongside of the anvil 101 and the pressure plate 102. These parts hold the leading end of the web D. While in this position of the swing arms, the gripper fingers 165, 166 close, as hereinbefore explained, onto the outer edges of the web D which project beyond the anvil 101 and pressure plate 102. The web thus is held tightly by the fingers and it is at this time that the pressure plate 102 is lifted to release the web.

Upon release of the web D, the swing arms 167 move back or inwardly while drawing the web with them a distance equal to the length of one overcap. This is the overcap measuring operation mentioned above and when the web is drawn out far enough the swing arms pause in their travel to permit the cut-off knives 118, 131 to sever the overcap from the web, as hereinbefore explained. During these measuring and severing operations the overcap is held tightly between the gripper fingers 165, 166.

When no containers are passing through the machine, the gripper fingers 165, 166 are prevented from functioning. The web D will not be gripped and will not be pulled out for cutting. This interruption of normal function is effected by a stop pin 251 (Figs. 1, 4, 5 and 13) which operates in conjunction with the stop pin 155 of the knife actuating lever 123 hereinbefore explained.

The stop pin 251 is located adjacent the cam lever 206 and slides in a bearing bracket 252 secured on the main frame 25. One end of the pin is connected by a link 253 to an arm 254 mounted on the upper end of a vertical shaft 255. Adjacent the arm 254, the shaft is carried in a bearing bracket 256 which extends out from the main frame 25. The shaft extends down through the middle of the tubular shaft 223 and at its lower end carries an arm 257 which is connected by a link 258 to the cam lever 39.

Hence as the cam lever 39 rocks to actuate the pusher plate 36 to position the containers in the machine, the lever also oscillates the vertical shaft 255 and thus moves the stop pin 251 into and out of the path of travel of the gripper finger actuating lever 206 in time with the movement of the lever. When the pusher plate 36 is stopped from feeding containers into the machine, the vertical shaft 255 is held stationary and its stop pin 251 is in an extended position in the path of travel of the finger actuating lever 206. Thus the stop pin prevents actuating of the lever and this holds the gripper fingers 165, 166 open so that they will not engage and withdraw the web D, as hereinbefore explained.

After the overcap is severed from the web the swing arms 167 resume their backward swing and thus carry the cut-off overcap into a position directly over the top of the container B which is being lifted by the lifter pad 65. The gripper fingers 165, 166 hold the overcap in this position until it is picked up by the container.

When the top of the rising container B engages against the suspended overcap A, the latter is clamped down tight on the container before the gripper fingers release it. Clamping of the overcap is brought about by a knock-out plunger 261 (Fig. 13) which is disposed in a clinching head 262 secured to the upper frame 94. The plunger is carried on a vertical stem 265 which extends up through a head sleeve 266 carried in a slide bearing 267 in the head. Near its top end, the plunger stem is formed with a socket 268 in which one end of a rock lever 269 is engaged.

The rock lever 269 is mounted on a pivot pin 271 carried in lugs 272 formed in the upper frame 94. The inner end of the rock lever engages in a bifurcated end of a cam lever 273 mounted on a pivot pin 274 secured in a bearing block 275 bolted to the upper frame. Intermediate its ends the cam lever carries a cam roller 277 which operates in a cam groove in a face cam 278 mounted on the cam shaft 212.

Thus as the cam 278 rotates, it rocks the cam lever 273 which in turn shifts the rock lever 269. Under control of this cam, the rock lever moves the knockout plunger 261 down against the overcap and the top of the rising container to hold the overcap in place. As the container continues to rise into the clinching head 262, the plunger rises with it and thus prevents displacement of the overcap.

Figure 19:
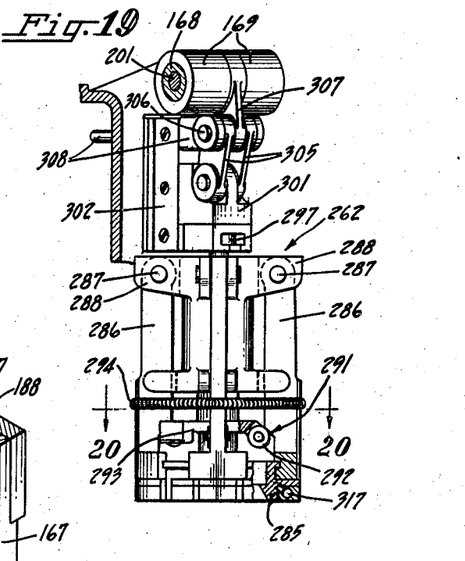
Fig. 19 is an enlarged view of a clinching head used in the machine, with parts broken away and shown in section.
Figure 20:
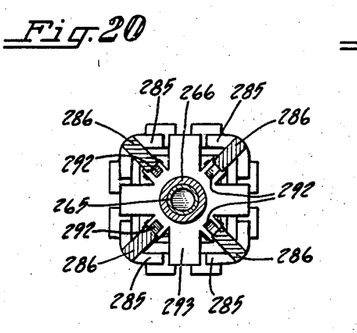
Fig. 20 is a sectional view taken substantially along the line 20—20 in Fig. 19.

As the container B with its superimposed overcap A enters the clinching head 262, the outer marginal edges of the overcap which project beyond the outer edges of the container top engage against segmental clinching jaws 285 (Fig. 13) which wipe the edges of the overcap down adjacent the sides of the container. Four such jaws are illustrated. These jaws are secured to the lower ends of vertically disposed arms 286 (see also Figs. 19 and 20) which are mounted on pivot pins 287 carried in lugs 288 formed on the head 262.

Adjacent the lower ends, the head arms 286 are formed with beveled cam surfaces 291 which engage against cam rollers 292 mounted on a disc 293 in the head 262. The arms are held in engagement with these cam rollers by a coiled spring 294 which encircles the head outside of and engaging against the arms.

The disc 293 is formed integrally with the head sleeve 266. The upper end of the head sleeve is secured by an adjusting screw 297 to a sliding bracket 301 which is disposed in a vertical slideway set off by cooperating gibs 302 (Fig. 3) bolted to the upper frame 94.

The sliding bracket 301 is shifted vertically to actuate the clinching jaws 285. For this purpose the sliding bracket is pivotally connected to one end of a pair of spaced and parallel toggle links 305 (Figs. 3, 13 and 19) which at their opposite ends carry a pivot pin 306 on which is mounted a toggle arm 307 and one end of an actuating rod 308. The toggle arm 307 is keyed to the swing arm pivot sleeve 168.

The actuating rod 308 is connected to the upper end of a cam lever 311 mounted on a pivot pin 312 carried in brackets 313 formed in the upper frame 94. Intermediate its ends, the cam lever carries a cam roller 314 which operates in a suitable groove in a face cam 315 (Fig. 5).

Hence rotation of the cam 315 rocks the cam lever 311 and through the toggle connection with the sliding bracket 301, shifts the head sleeve 266 through a downward or operating stroke and then upward through a return stroke. On the down stroke, the sleeve depresses the disc 293 and the cam rollers carried thereon and this permits the spring 294 to move the jaw arms 286 inwardly. This movement of the jaw arms presses the jaws 285 inwardly against the wiped down edges of the overcap A and thus folds the overcap edges up under the overhanging top ledges C of the container. At the same time the head sleeve presses down slightly on the knockout plunger 261 and thus sets up a squeezing action between the plunger and the jaws to bond the folded-under edges of the overcap to the container ledges.

The jaws 285 are heated, to facilitate the bonding of the overcap edges to the container ledges by partially melting the wax on the container. This heating is effected by electric heating units 317 (Fig. 13) which are embedded in the jaws and which may be connected to any suitable source of electric energy for heating the units. It is this folding and heating action on the overcap that permanently clinches it in place on the container.

After such a clinching operation, the jaws 285 are opened by an up-stroke of the head sleeve 266. This brings the cam rollers 292 on the head sleeve disc 293 against the bevel cam surfaces of the jaw arms 286 and thus spreads apart the arms and the jaws carried thereon, under the resistance of the spring 294.

When the jaws 285 are fully open, the lifter pad 65 carries the sealed container down to its original level in readiness for discharge from the machine. At this level the container is engaged by a discharge finger 321 (Figs. 3 and 6) of the stroke bar 58 and is pushed off the lifter pad 65 onto a discharge belt 322. The belt operates over a pulley 323 mounted on a short pulley shaft 324 (see also Fig. 10) carried in a bearing 325 formed in the gear housing 62.

The pulley 323 is rotated constantly by a bevel gear 327 which is located inside the gear housing 62 and is mounted on the pulley shaft 324. This gear meshes with and is driven by a bevel pinion 328 mounted on a vertical shaft 329, the upper end of which is journaled in a bearing 331 formed in the bracket 61 secured to the top of the gear housing. The lower end of the shaft is journaled in a bearing 332 formed in the bottom of the housing. This lower end of the shaft extends below the bearing and carries a bevel gear 333 which meshes with a driving bevel pinion 334 mounted on the main drive shaft 50. Through this connection the discharge belt is constantly operated to carry containers received thereon to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for applying protective overcaps to moving containers, said machine including an overcap applying head, a pair of swing arms located adjacent said head and means for effecting relative movement between the containers and said head for applying an overcap to a said container: the combination of gripper fingers mounted on said swing arms for pulling a continuous web of overcap material to measure off a predetermined length of the web, cutting devices disposed adjacent the path of travel of said web for severing the gripped measured-off portion of the web from the remainder of the web to produce an individual overcap, and actuating means cooperatively associated with said swing arms, said actuating means operating to shift the arms to first measure off the overcap and thereafter to locate the held cut-off overcap in position between the container and the applying head.

2. In a machine for applying protective overcaps to moving containers, said machine including an overcap applying head and means for effecting relative movement between the containers and said head for applying an overcap to a said container: the combination of a pair of swing arms located adjacent said head, gripper fingers mounted on said swing arms for pulling a continuous web of overcap material to measure off a predetermined length of the web, cutting devices disposed adjacent the path of travel of said web for severing the held measured-off portion of the web from the remainder of the web to produce an overcap, actuating means cooperatively associated with said swing arms, said actuating means operating to shift the arms to first measure off the overcap and thereafter to locate the held cut-off overcap in position between the container and the applying head, means for operating said gripper fingers independently of said swing arms to retain a grip on the cut-off overcap while the latter is cut off and carried to the container, and means for actuating said gripper finger operating means to release the severed and positioned overcap immediately prior to the applying operation.

3. In a machine for applying protective overcaps to containers, said machine including feeding devices for introducing containers into the machine in a continuous procession, means engageable with the containers as they enter the machine for separating them individually from the entering procession to arrange them in timed order, auxiliary feeding devices for intermittently advancing the individual timed containers into and beyond an overcap applying station, and an overcap applying head operatively disposed at said station the combination of means for moving an individual overcap into position between a said container and said applying head, said moving means including a pair of swing arms located adjacent said head, gripper fingers mounted on said swing arms for pulling a continuous web of overcap material to measure off a predetermined length of the web, cutting devices disposed adjacent the path of travel of said web for severing the measured-off portion of the web from the remainder of the web to produce an overcap, and actuating means for moving said swing arms relative to said head to properly locate the overcap with respect to the container preparatory to the applying operation.

4. In a machine for applying protective overcaps to containers, the combination of means for holding a web of overcap material, a pair of swing arms pivotally mounted relative to said web holding means, gripper fingers on said arms for gripping an end of the web and for pulling the web through said holding means, cutting devices pivotally mounted adjacent said holding means for cutting the web to produce an overcap, and actuating means for moving said swing arms in time with said cutting devices to hold the overcap while it is cut from the web and to carry the cut-off overcap to a position for application to a container.

5. The combination as defined in claim 1 wherein the machine also includes means in the overcap applying head movable into engagement with the located overcap to hold the latter in position against the container during relative movement between the container and the head and during the overcap applying operation.

AUGUST E. ALMGREN.